Feb. 13, 1951
E. F. DE MERS
2,541,918

UNIDIRECTIONAL POWER SUPPLY

Filed Dec. 31, 1947

*INVENTOR.*
Edward F. De Mers.

*BY* T. L. Bowes

Atty

Patented Feb. 13, 1951

2,541,918

UNITED STATES PATENT OFFICE 2,541,918

UNIDIRECTIONAL POWER SUPPLY

Edward F. De Mers, Urbana, Ill., assignor to Stromberg-Carlson Company, a corporation of New York Application December 31, 1947, Serial No. 794,874

3 Claims. (Cl. 315—22)

The present invention relates to apparatus for providing a source of unidirectional energy and more particularly to apparatus for deriving a high negative voltage from a power source of periodic pulses of high positive potential.

It is a well known fact that cathode ray tubes such as are extensively employed in television receivers today, require a source of high unidirectional potential for certain of the electrodes. This potential may be over 20,000 volts for large cathode ray tubes. This potential is necessary to produce the average brightness on the cathode ray screen corresponding to that produced at the instant the picture was transmitted. One method of obtaining the high unidirectional potential suggests itself immediately, namely by employing a step-up transformer and a rectifier. However, due to the large amount of insulation required, such a transformer is very bulky and as a result cannot satisfactorily be placed within small television receiver cabinets.

The currents consumed by the electrodes of such cathode ray tubes requiring high unidirectional potentials such as the second anode, the screen grid and the like are very small, often only a fraction of one milliampere, so that the power consumed from the high unidirectional voltage supply is very low, i. e. of the order of two or three watts. It is common practice in television receiving apparatus to provide generators of currents of saw-tooth wave form which provide the desired scanning currents both for horizontal and vertical scanning. These scanning currents of saw-tooth wave form, used to deflect the cathode ray beam in order to scan the picture, produce very short high voltage pulses, the pulses occurring during the so-called "fly back" or return trace period. Such "fly back" periods may have a repetition rate which varies widely. According to the standards set in the United States, the "fly back" periods for the horizontal scanning generator reoccur 15,750 times per second. Consequently there is produced a signal having a frequency of the order of 15,750 cycles per second. With some of the more recent types of generators for producing signals of saw-tooth wave form, the retrace or fly back period has been made very short, or in other words the rate of change of the current from the maximum point to the minimum point of the saw-tooth wave is very high so that a voltage pulse is produced of sufficiently high positive potential to provide the desired potential for the second anode and the like, assuming that it could readily be converted to a unidirectional potential.

In United States Letters Patent No. 2,373,165 there is disclosed an arrangement for rectifying the high voltage pulses produced during the fly back periods of a saw-tooth wave generator to obtain a high unidirectional potential for the second anode and screen grid of a cathode ray tube. The high potential obtained is a positive potential. It may be desirable to ground the positive terminal of the high potential source or in other words to ground the second anode whereupon it is necessary to have a source of high negative potential. The present invention is specifically concerned with a new and improved arrangement for achieving in a simple manner a high negative unidirectional potential from the periodic voltage pulses which occur during the retrace period of a saw-tooth wave scanning generator.

Accordingly it is an object of the present invention to provide a new and improved source of high voltage negative polarity potential.

It is another object of the present invention to provide a device for converting the high voltage pulses produced during the retrace or fly back period of a saw-tooth wave scanning generator to a high negative unidirectional potential.

Still another object of the present invention is to provide a new and improved source of high voltage negative unidirectional potential for the various electrodes of a cathode ray tube without the requirement of a transformer.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawing in which.

Figure 2:
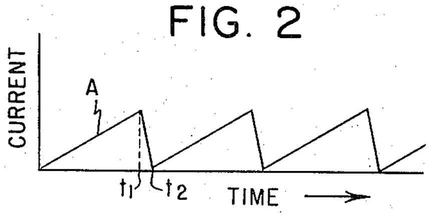
Figs. 2 and 3 are curve diagrams to aid in understanding the present invention.

Referring now to the drawing there is illustrated in block form a saw-tooth wave generator generally designated at 10, which generator is capable of producing a current having a saw-tooth wave form as shown by the curve A in Fig. 2 of the drawing. Preferably this saw-tooth wave generator 10 is capable of producing a signal of saw-tooth wave form in which the change from the maximum to the minimum point of the saw-tooth wave is accomplished in a very short period of time. This interval of time between the time instants $t_1$ and $t_2$ shown in Fig. 2 of the drawing in the case of a scanning generator for a television receiver is referred to as the fly back or retrace interval. Since the television receiver is ineffective during this period to produce a picture it is obviously desirable to have this period as short as possible. Preferably therefore saw-tooth generator 10 may be any type of generator capable of producing a saw-tooth current wave A of Fig. 2 having the steep wave front with respect to the portion of the wave representing the retrace or fly back interval. Such a saw-tooth wave generator is extensively employed in connection with television receivers, two different generators being required for each receiver; one for producing the vertical scanning current and the other for producing the horizontal scanning current. Since the horizontal scanning current is of much higher frequency than the vertical scanning current it is assumed that the saw-tooth wave generator 10 is employed when combined with a television receiver as the source of the horizontal scanning current. It is a well known fact that in connection with a generator for generating a scanning current of saw-tooth wave form very high voltage pulses are periodically produced, the high voltages occurring during the short retrace or fly back intervals During the remaining period of time a very low voltage which is actually of negative potential is produced. This pulse type voltage which appears at the anode of a saw-tooth wave scanning current generator is represented by the curve B in Fig. 3 of the drawing. The arrangement of Figs. 2 and 3 of the drawing clearly indicates that the pulses occur during the retrace or fly back interval which has a very short time period $T_1$ occurring between the times $t_1$ and $t_2$. The time interval between pulses when the voltage is negative with respect to its average value is designated as $T_2$ in Fig 3 of the drawing.

Figure 3:
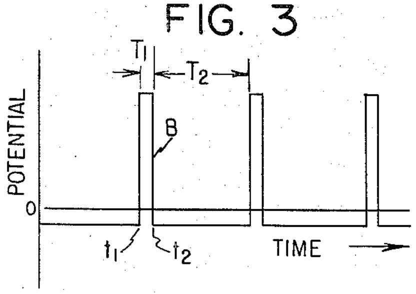

In accordance with the present invention, means are provided for converting the pulse voltage represented by the curve B of Fig. 3 of the drawing to a high negative unidirectional potential for application to certain electrodes of a cathode ray tube generally designated at 11. This cathode ray tube conventionally comprises a cathode 12, a control electrode or grid 13 and a so-called second anode 14. Actually such a cathode ray tube 11 will also comprise certain other electrodes among which are a screen grid and a so-called first anode. These have been omitted from the disclosure for the sake of simplifying the same. The video signal is applied to the terminals 15 and 16 of the cathode ray tube 11 which are connected to the cathode 12 and the control grid 13 respectively for varying the intensity of the image in accordance with the intensity of the picture signal or display. The second anode 14 is indicated as being connected to ground generally designated at 17.

In order that a high unidirectional potential may be impressed between the second anode 14 and the cathode 12 with the grounded second anode 14 more positive than the cathode 12 it is clear that a high negative voltage must be applied to the cathode 12. The present invention is primarily concerned with converting a voltage comprising periodically occurring high positive pulses of the form designated by the curve B of the Fig. 3 of the drawing to a high negative unidirectional potential. As illustrated one terminal 18 of the saw-tooth generator 10 is grounded. The other terminal 19 is connected to the cathode 12 of the cathode ray tube 11 through a suitable control arrangement of the present invention generally designated at 20. As illustrated the control arrangement 20 includes a path to ground for the high voltage positive pulses appearing at the terminal 19 through a serially arranged capacitor 21 and a diode 22 whose anode 23 is connected to a terminal 24 which is connected to one electrode or plate of the capacitor 21. The other plate of the capacitor 21 is connected to the terminal 19 of the saw-tooth wave generator 10. The cathode 25 of the diode 22 is connected to ground as indicated. It is apparent that upon the occurrence of one of the high voltage pulses of positive polarity for a period $T_1$ during the fly back or retrace period of the saw-tooth scanning current the diode 22 affords a low resistance path to ground, whereby the capacitor 21 is charged to a high potential of the polarity designated in Fig. 1 of the drawing. The terminal 24 is substantially at ground potential since it is grounded through the low impedance diode 22. During the portion of the pulse supply between pulses represented by the period $T_2$ in Fig. 3 of the drawing the potential at the terminal 19 of the saw-tooth wave generator 10 is slightly negative. The anode 23 of the diode 22 is therefore at the high negative potential of the associated capacitor terminal 24 by virtue of the charge on capacitor 21 and consequently the diode 22 is rendered nonconductive.

In accordance with the present invention the terminal 24 of the capacitor 21 is connected to ground through a serially arranged diode 27 and a capacitor 28 having a common terminal 29. The anode 30 of the diode 27 is connected to the terminal 29 while the cathode 31 of the diode 27 is connected to the terminal 24. During the time period $T_2$ between high positive pulses the charge appearing on the condenser 21 is transferred to the condenser 28 through the diode 27 so as to charge the condenser 28 to the polarity shown in Fig. 1 of the drawing with the terminal 29 at a high negative potential.

The capacitance of the condenser 28 is preferably sufficiently large so that the high negative potential of the point 29 is substantially a direct current potential with a ripple produced during the fly back intervals. By means of a suitable filter comprising the capacitor 32 and the resistor 33 interposed between the cathode 12 of the cathode ray tube 11 and the terminal 29 a substantially pure unidirectional potential of high negative polarity is provided.

Figure 1:
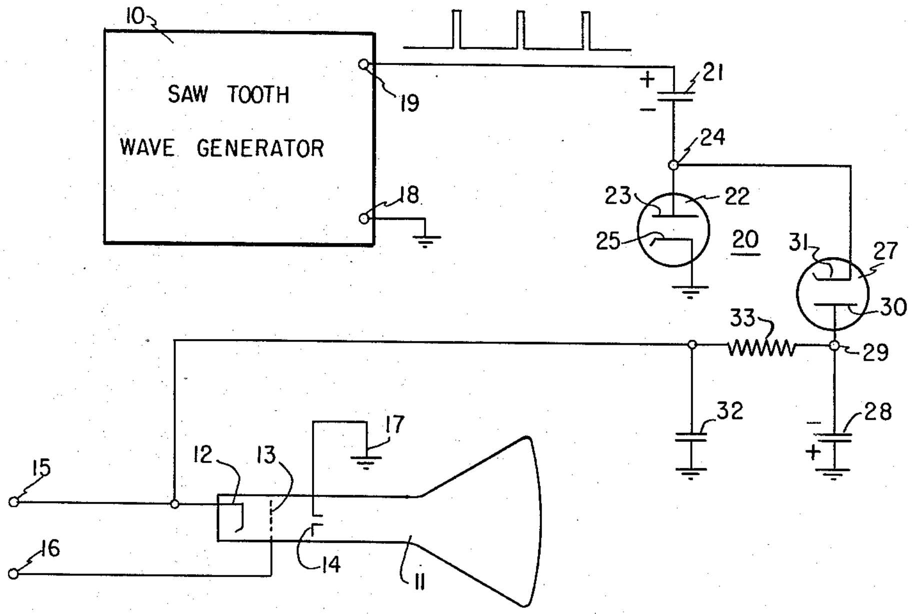
Fig. 1 is a schematic diagram, with certain portions thereof shown in block form, of one application of a unidirectional power supply embodying the present invention.

In view of the detailed description included above the operation of the arrangement disclosed in Fig. 1 of the drawing will be understood by those skilled in the art. There is provided a simple means requiring no bulky step-up transformers for supplying a high negative unidirectional potential from a pulse supply having high positive pulses. By means of two simple diodes and two capacitors the pulses are used to charge one capacitor and then the charge is transferred to another capacitor so as to furnish the desired potential.

Figure 4:
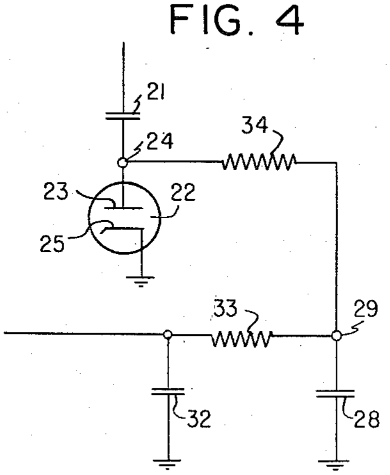
Fig. 4 is a schematic diagram of a modification of a portion of the arrangement disclosed in Fig. 1.

The arrangement described in Fig. 1 of the drawing will operate satisfactorily independently of the ratio of the time periods $T_1$ and $T_2$. It will be understood that in television applications the time period $T_1$ is a very short period relative to the time $T_2$. Where this is the case the diode 27 may be replaced by a resistor 34 as is shown in Fig. 4 of the drawing. The corresponding parts of Fig. 4 are designated by the same reference numerals as in the preceding figures. It is essential in the Fig. 4 arrangement that the time constant of the resistor 34 and the capacitor 28 be substantially larger than the time interval $T_1$. In other words $$\frac{1}{RC} > T_1$$

where R is the resistance of the resistor 34 and C is the capacitance of the capacitor 28.

From the above discussion it will be apparent that there has been provided a simple arrangement for deriving from a pulse supply having high positive voltage pulses a high negative unidirectional voltage which has special application where cathode ray tubes are employed.

It will be apparent to those skilled in the art that the present invention is not limited to the particular embodiments shown and described, but that changes and modifications may be made without departing from the spirit and scope of the present invention. It is aimed in the appended claims to cover all such changes and modifications.

What is desired to be secured by Letters Patent of the United States is:

1. In a power supply; a generator for generating currents of saw-tooth wave form having a steep wave front so as to produce high positive voltage pulses of very short duration, means for converting said pulse portion of said saw tooth wave into a high unidirectional voltage of negative polarity, comprising a path to ground for said positive pulses including a first capacitor and a first electron discharge device arranged in series so that said first capacitor is periodically charged to substantially the magnitude of said pulse portion of said wave, a second capacitor, and means comprising a second electron discharge device interconnecting said first and second capacitors for transferring the charge from said first capacitor to said second capacitor between successive pulses so as to charge said second capacitor to a high negative potential, and load means connected to utilize the high negative potential as a power supply.

2. In combination with an apparatus for reproducing electrically transmitted pictures comprising a cathode ray tube including an anode, a cathode and a control electrode, means for generating a scanning current having a saw-tooth wave form, means for utilizing the portion of said scanning current which has the slower rate of change to deflect the cathode ray produced by said cathode ray tube, means for converting the other portion of said scanning current to a high unidirectional negative potential for one of the electrodes of said cathode ray tube comprising a serially connected first diode and first capacitor, means for charging said capacitor to a predetermined potential in response to the flow of said other portion of said scanning current, means including a second capacitor and a serially arranged second diode for receiving the charge from said first capacitor while the portion of said scanning current having the slow rate of change exists, and filter means for converting the potential across said second capacitor to a high negative unidirectional potential, said first diode being connected so that current flow is permitted therethrough only when said other portion of said scanning current exists, said second diode being connected so that current flow is permitted therethrough only when the portion of said scanning current which has the slower rate of change exists.

3. In combination; a cathode ray tube having at least an anode, a cathode and a control electrode, and a power supply comprising means for generating a cyclic recurrent scanning current, means for utilizing a first portion of said scanning current to deflect the cathode ray produced by said cathode ray tube, means for converting the remaining portion of said scanning current to a high unidirectional negative potential comprising a serially connected first electron discharge device and first capacitor, means for charging said first capacitor responsive to the flow of said remaining portion, means including a second capacitor and a serially connected second electron discharge device for receiving the charge from said first capacitor during the flow of the said first portion, filter means for converting the potential across said second capacitor to a high negative unidirectional potential, and means connecting an element of said cathode ray tube to the filter means to utilize the high negative potential as a power supply.

EDWARD F. DE MERS.

REFERENCES CITED

The following references are of record in the file of this patent:

UNITED STATES PATENTS

| Number | Name | Date |
|---|---|---|
| 2,350,069 | Schrader et al. | May 30, 1944 |
| 2,415,567 | Schoenfeld | Feb. 11, 1947 |
| 2,431,766 | Miller et al. | Dec. 2, 1947 |
| 2,440,787 | Schade | May 4, 1948 |
| 2,448,299 | Dorne | Aug. 31, 1948 |